(12) United States Patent
Guardianelli

(10) Patent No.: US 10,384,534 B2
(45) Date of Patent: Aug. 20, 2019

(54) CLOSING SYSTEM FOR A DOOR OF THE FUEL TANK

(71) Applicant: CEBI ITALY S.P.A., Dronero (CN) (IT)

(72) Inventor: Daniele Guardianelli, Loreto (IT)

(73) Assignee: CEBI ITALY S.P.A., Dronero (CN) (IT)

( * ) Notice: Subject to any disclaimer, the term of this patent is extended or adjusted under 35 U.S.C. 154(b) by 160 days.

(21) Appl. No.: 15/719,822

(22) Filed: Sep. 29, 2017

(65) Prior Publication Data

US 2018/0105036 A1 Apr. 19, 2018

(30) Foreign Application Priority Data

Oct. 18, 2016 (IT) ........................ 102016000104772

(51) Int. Cl.
| | |
|---|---|
| *B62D 25/00* | (2006.01) |
| *B60K 15/05* | (2006.01) |
| *E05B 63/22* | (2006.01) |
| *E05B 81/08* | (2014.01) |
| *E05B 81/16* | (2014.01) |
| *E05B 81/90* | (2014.01) |
| *E05B 83/34* | (2014.01) |

(52) U.S. Cl.
CPC .............. *B60K 15/05* (2013.01); *E05B 63/22* (2013.01); *E05B 81/08* (2013.01); *E05B 81/16* (2013.01); *E05B 81/90* (2013.01); *E05B 83/34* (2013.01); *B60K 2015/053* (2013.01); *B60K 2015/0569* (2013.01); *B60K 2015/0584* (2013.01); *E05Y 2900/534* (2013.01)

(58) Field of Classification Search
CPC .......... A47B 88/467; A47B 2210/0018; Y10T 292/1082; H01H 33/40; H01H 3/3015; G07C 9/00571; G07C 9/00309; E05Y 2900/531; E05B 79/04; F01L 13/065
USPC ....................................................... 296/97.22
See application file for complete search history.

(56) References Cited

U.S. PATENT DOCUMENTS

| | | | | |
|---|---|---|---|---|
| 5,462,190 A | * | 10/1995 | Lienhart | ............ B60K 15/0406 220/375 |
| 5,658,036 A | * | 8/1997 | Benoist | .................. B60K 15/05 220/86.2 |
| 5,906,406 A | * | 5/1999 | Pajakowski | ............ B60K 15/05 220/86.2 |
| 5,954,387 A | * | 9/1999 | Fisher | ................ B60K 15/0406 220/86.2 |

(Continued)

FOREIGN PATENT DOCUMENTS

WO 2016098851 A1 6/2016

*Primary Examiner* — Kiran B Patel
(74) *Attorney, Agent, or Firm* — Egbert Law Offices, PLLC

(57) ABSTRACT

A closing system includes a module having a tubular body with a duct suitable for communicating with a fuel tank of a vehicle; a door hinged to the body of the module, and a lock mounted in the body of the module. The lock has a box with a shell and a lid, a closing pin suitable for fastening the pin of the door, a spring that stresses the closing pin, a cam obtained in the closing pin, a follower with a tip that acts in the cam, a latch that engages and locks the closing pin, an actuator suitable for actuating the latch, and an emergency mechanism that can be manually actuated by the user to unlock the closing pin from the latch.

10 Claims, 13 Drawing Sheets

(56) References Cited

U.S. PATENT DOCUMENTS

| | | | | |
|---|---|---|---|---|
| 6,315,144 | B1* | 11/2001 | Foltz | B60K 15/0406 220/255 |
| 6,352,295 | B1* | 3/2002 | Leitner | B60K 15/05 16/255 |
| 6,752,448 | B1* | 6/2004 | Hsu | B60K 15/05 220/86.2 |
| 7,258,386 | B2* | 8/2007 | Leitner | B60K 15/0406 16/286 |
| 7,281,640 | B2* | 10/2007 | Hagano | B60K 15/0406 220/375 |
| 7,311,348 | B1* | 12/2007 | Bang | B60K 15/0406 220/86.2 |
| 7,380,861 | B2* | 6/2008 | Engel | B60K 15/05 296/97.22 |
| 7,914,063 | B2* | 3/2011 | Lederer | B60K 15/04 292/207 |
| 7,922,231 | B2* | 4/2011 | Schoenow | B60K 15/05 296/97.22 |
| 8,292,113 | B2* | 10/2012 | Nakaya | B60K 15/05 220/263 |
| 8,398,127 | B2* | 3/2013 | Persiani | B60K 15/05 292/163 |
| 8,622,442 | B2* | 1/2014 | Imatomi | B60K 15/05 292/143 |
| 8,677,690 | B2* | 3/2014 | Lee | B60K 15/05 296/97.22 |
| 8,684,443 | B2* | 4/2014 | Hara | B60R 19/48 296/97.22 |
| 8,905,768 | B2* | 12/2014 | Hara | H01R 13/447 439/136 |
| 9,038,499 | B2* | 5/2015 | Ishiguro | B60K 15/05 220/315 |
| 9,083,163 | B2* | 7/2015 | Tamaoki | B60K 15/05 |
| 9,227,509 | B1* | 1/2016 | Jones | B60K 15/05 |
| 9,340,107 | B2* | 5/2016 | Chiba | B60K 15/05 |
| 9,376,012 | B2* | 6/2016 | Brown | B60K 15/05 |
| 9,404,446 | B2* | 8/2016 | Fujiwara | F02M 25/0854 |
| 9,428,046 | B2* | 8/2016 | Morris | E05F 7/005 |
| 9,434,248 | B2* | 9/2016 | Hagano | B60K 15/05 |
| 9,434,249 | B2* | 9/2016 | Park | B60K 15/05 |
| 9,457,649 | B2* | 10/2016 | Fujiwara | B60K 15/04 |
| 9,481,240 | B1* | 11/2016 | Stack | B60K 15/05 |
| 9,493,967 | B2* | 11/2016 | Basavarajappa | B60K 15/05 |
| 9,643,487 | B2* | 5/2017 | Szawarski | B60K 15/05 |
| 9,662,973 | B2* | 5/2017 | Betzen | B60K 15/05 |
| 9,662,990 | B2* | 5/2017 | Jeong | B60K 15/05 |
| 9,718,350 | B2* | 8/2017 | Lee | B60K 15/05 |
| 9,856,679 | B2* | 1/2018 | Ito | E05B 83/34 |
| 9,862,265 | B2* | 1/2018 | Lee | B60K 15/05 |
| 9,878,613 | B2* | 1/2018 | Yang | B60K 15/05 |
| 9,925,865 | B2* | 3/2018 | Stack | B60K 15/05 |
| 9,950,615 | B2* | 4/2018 | Horikawa | B60K 15/05 |
| 9,969,257 | B2* | 5/2018 | Dallos, Jr. | B60K 15/05 |
| 9,969,279 | B2* | 5/2018 | Southey | B60L 11/1818 |
| 10,011,170 | B2* | 7/2018 | Horikawa | B60K 15/05 |
| 10,086,693 | B2* | 10/2018 | Logan | B60K 15/05 |
| 10,173,523 | B2* | 1/2019 | Persiani | B60K 15/05 |
| 10,179,727 | B2* | 1/2019 | Hong | B60K 15/04 |
| 10,196,840 | B2* | 2/2019 | Beck | B60K 15/05 |
| 10,245,943 | B2* | 4/2019 | Mori | B60K 15/04 |
| 2003/0062741 | A1* | 4/2003 | Joerg | B60K 15/05 296/97.22 |
| 2006/0102401 | A1* | 5/2006 | Pellillo | B62D 21/152 180/69.1 |
| 2006/0289084 | A1* | 12/2006 | Groom | B60K 15/04 141/367 |
| 2008/0136210 | A1* | 6/2008 | Scott | B60K 15/04 296/97.22 |
| 2009/0026794 | A1* | 1/2009 | Zentner | B60K 15/05 296/97.22 |
| 2009/0095373 | A1* | 4/2009 | Correira | B60K 15/04 141/350 |
| 2009/0189410 | A1* | 7/2009 | Gurtatowski | B60K 15/05 296/97.22 |
| 2009/0309386 | A1* | 12/2009 | Yamamoto | B60K 15/0406 296/97.22 |
| 2010/0230992 | A1* | 9/2010 | Winkler | B60K 15/05 296/97.22 |
| 2010/0295332 | A1* | 11/2010 | Benjey | B60K 15/04 296/97.22 |
| 2011/0285165 | A1* | 11/2011 | Baba | E05F 5/022 296/97.22 |
| 2012/0153661 | A1* | 6/2012 | Woodworth | B60K 15/05 296/97.22 |
| 2012/0161462 | A1* | 6/2012 | Zentner | B60K 15/04 296/97.22 |
| 2013/0134737 | A1* | 5/2013 | Ogata | B60K 15/05 296/97.22 |
| 2013/0249234 | A1* | 9/2013 | Higgins | B60K 15/05 296/97.22 |
| 2013/0257089 | A1* | 10/2013 | Minock | B60K 15/05 296/97.22 |
| 2014/0183899 | A1* | 7/2014 | Frommann | B60K 15/05 296/97.22 |
| 2015/0048644 | A1* | 2/2015 | Georgi | B60K 15/05 296/97.22 |
| 2017/0001517 | A1* | 1/2017 | Herrmann | B60K 15/05 |
| 2018/0179789 | A1* | 6/2018 | Ciarmatori | E05B 81/16 |

* cited by examiner

CLOSING SYSTEM FOR A DOOR OF THE FUEL TANK

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present patent application for industrial invention relates to a closing system for a door of the fuel tank of a vehicle.

2. Description of Related Art Including Information Disclosed Under 37 CFR 1.97 and 37 CFR 1.98

As it is known, vehicles have a fuel door module that is fixed to the body of the vehicle in such way to define an opening for accessing the fuel tank. The opening of the module is closed by a door that is hinged to the module. A closing system is provided to close and open the door. Such a closing system generally comprises a lock of push-push type, which is suitable for alternately and automatically fasten and unfasten the door every time the door is pressed manually.

This type of push-push locks comprises latches that are actuated by an electric actuator. The latch prevents the free opening of the door when the actuator is in closing condition. Normally, the actuator is automatically actuated every time the centralized closing of the vehicle doors is actuated.

There are three different models of closing systems.

The first model comprises a latch and a lock separately mounted on the module. The lock has a pin that fastens the door and a follower that cooperates with a cam provided on the internal side of the door. The latch is fastened to a slot provided in the door. The fuel door module is only supplied with the lock in assembled condition. Therefore, the mounting of this first model of closing system in the body of the vehicle requires two different fixing operations: the first operation is dedicated to fixing the latch and actuator assembly on the module, whereas the second operation is dedicated to fixing the module to the body of the vehicle.

The second model of closing system comprises a lock comprising a latch and actuator assembly. In such a case, the latch interferes with the pin of the lock in such a way to lock the pin of the lock. In any case, the door is provided with the cam that cooperates with the follower provided in the lock. In such a case, the lock is supplied separately from the module, and therefore the mounting of this second model of closing system in the body of the vehicle still requires two different fixing operations: the first operation is dedicated to fixing the lock to the module, whereas the second operation is dedicated to fixing the module to the body of the vehicle.

In order to reduce the mounting time and cost of the closing system, a third model of closing system has been recently proposed, which comprises a lock assembly directly applied on the exterior of the module in such a way that the closing system can be mounted with only one fixing operation, i.e. by fixing the module that acts as support both for the door and for the lock assembly.

It must be considered that the module must be mounted inside the body of the vehicle, by inserting it from the exterior towards the interior through a hole of the body of the vehicle. Such an installation operation of the module is hindered by the presence of the cumbersome lock assembly that is directly applied on the exterior of the module. Obviously, car manufacturers are not willing to drill holes with different dimensions on the body of the vehicle according to the type of closing system to be installed. Therefore, in order to make the mounting of this third type of closing system easier, the diameter of the module is considerably reduced, in such a way to compensate the volume of the lock assembly applied on the external wall of the module.

The reduction of the internal diameter of the module is impaired by some drawbacks, such as the uncomfortable, incomplete introduction of a fuel pump into the tank and the difficulty to comply with the dimensional standards imposed by the applicable legislation.

WO2016/098851 discloses an opening and closing device of a fuel door of a vehicle comprising a lock of push-push type, which is suitable for fastening and unfastening the door every time the door is pressed.

The purpose of the present invention is to eliminate the drawbacks of the prior art by providing a closing system that, in spite of being provided with a lock assembly applied on the external wall of the module, does not require to reduce the module, which can have an internal diameter that is substantially identical to the one of models of closing systems in which the lock assembly is not applied on the external wall of the module.

Another purpose of the present invention is to disclose a closing system with lock assembly with reduced size and volume, which is suitable for mounting the module rapidly and easily in the body of the vehicle.

Another purpose of the invention is to disclose a closing system provided with a lock assembly of push-push type that can be applied on the external wall of the module, on the opposite side with respect to the side where the door is hinged.

BRIEF SUMMARY OF THE INVENTION

These purposes are achieved according to the invention with the characteristics of the independent claim 1.

Advantageous embodiments of the invention appear from the dependent claims.

The closing system of the invention comprises:

a module having a tubular body with a duct suitable for communicating with a fuel tank of a vehicle, a door hinged to the body of the module with a hinge, in such manner to close the duct; said door being provided with a pin that protrudes towards the duct of the module, and a lock mounted in the body of the module, outside the duct.

The lock comprises:
a box comprising a shell and a lid,
a closing pin suitable for fastening said pin of the lid; said closing pin being mounted in translating mode in said box in such manner to slide along an axis to go from a retracted closing position to an extracted opening position,
a spring that stresses the closing pin towards the extracted opening position,
a cam obtained in said closing pin,
a follower revolvingly mounted in said shell in such manner to rotate freely around an axis and having a tip that acts in said cam of the closing pin to control the translation movement of the closing pin,
a latch comprising a slide mounted in translating mode in the shell in such manner to slide along an axis orthogonal to the sliding axis of the closing pin in order to go from a retracted unlocking position to an advanced locking position wherein the latch engages and locks the closing pin,
an actuator mounted in the shell and suitable for actuating said latch, and
an emergency mechanism acting on said closing pin and on said latch; said emergency mechanism being manually actuated by the user to unlock the closing pin from the latch.

BRIEF DESCRIPTION OF THE SEVERAL VIEWS OF THE DRAWINGS

Additional features of the invention will appear clearer from the detailed description below, which refers to merely illustrative, not limiting embodiments shown in the attached drawings.

DETAILED DESCRIPTION OF THE INVENTION

Figure 1:
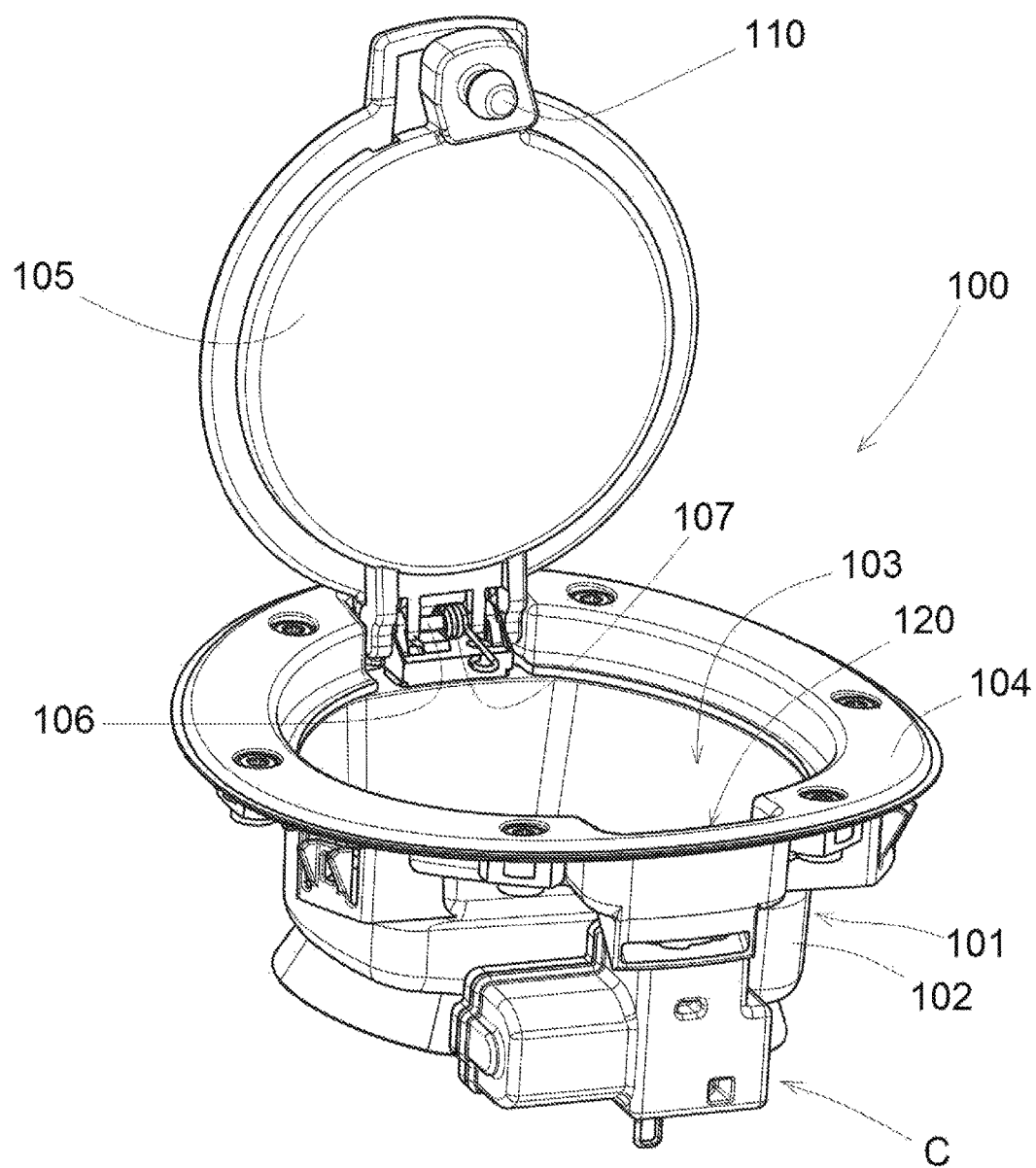
FIGS. 1, 2 and 3 are perspective views of the closing system according to the invention from different angles.

With reference to the Figures, the closing system of the invention is described, which is generally indicated with reference numeral 100.

Figure 2:
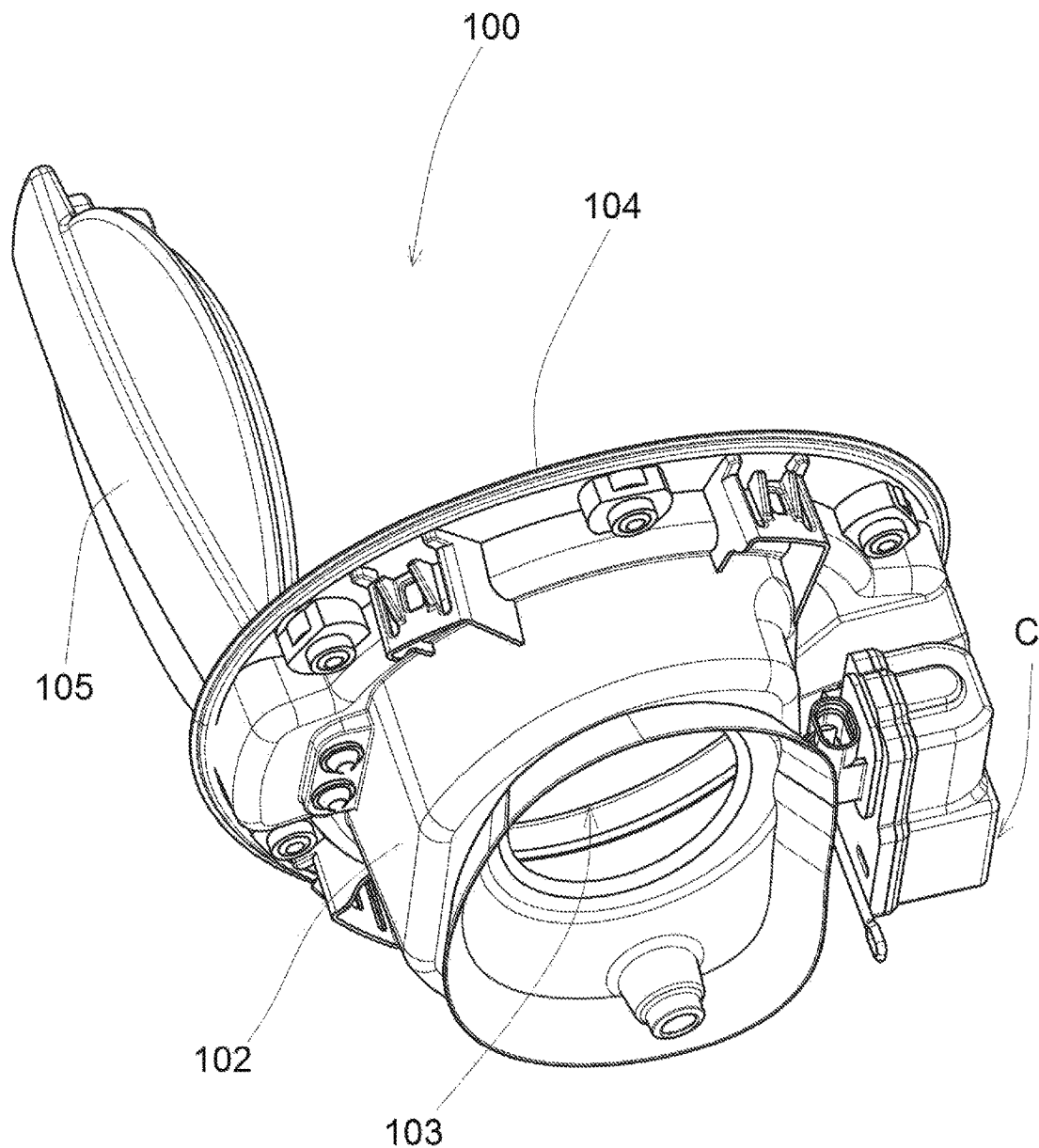
Figure 3:
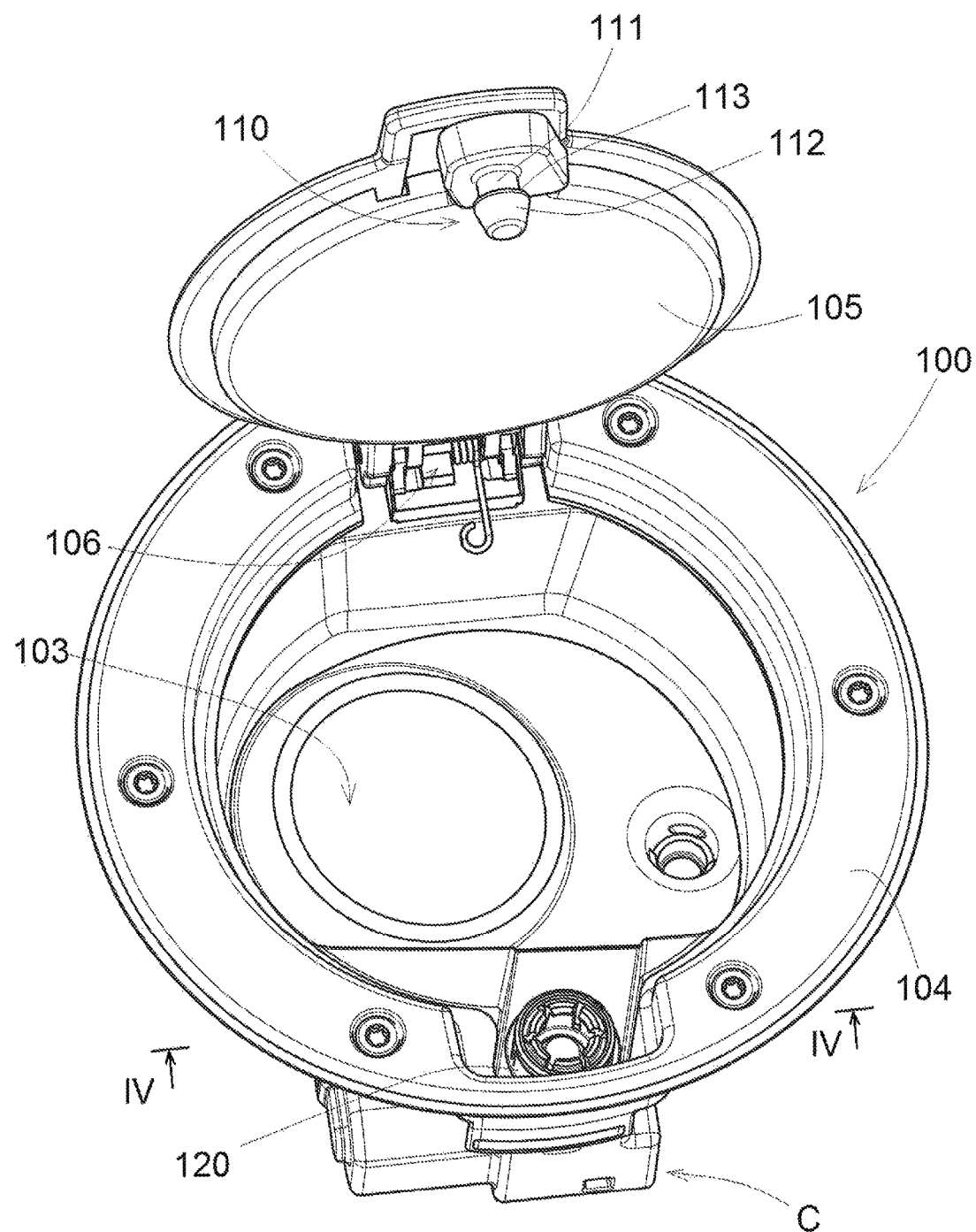

With reference to FIGS. 1-3, the closing system (100) comprises a module (101) having a tubular body (102) that defines a duct (103) suitable for communicating with a fuel tank of a vehicle.

An annular flange (104) protrudes externally from the body (102) of the module for being fixed to a portion of the body of the vehicle.

A door (105) is hinged to the body (102) with a hinge (106) in such manner to close the duct (103) defined by the body of the module. A spring (107) is applied in the hinge (106) to maintain the door (105) in open position.

A pin (110) protrudes from the door towards the interior of the duct (103) of the module. The pin (110) is disposed in diametrally opposite position with respect to the hinge (106). The pin (110) is shaped like a mushroom and comprises a stem (111) and a truncated-conical head (112) that defines an annular stop surface (113).

A lock (C) is fixed to the body (102) of the module, outside the duct (103), in diametrally opposite position with respect to the hinge (106). An opening (120) is provided in the body (102) of the module in correspondence of the lock (C) in order to make the lock (C) cooperate with the pin (110) of the door.

Figure 4:
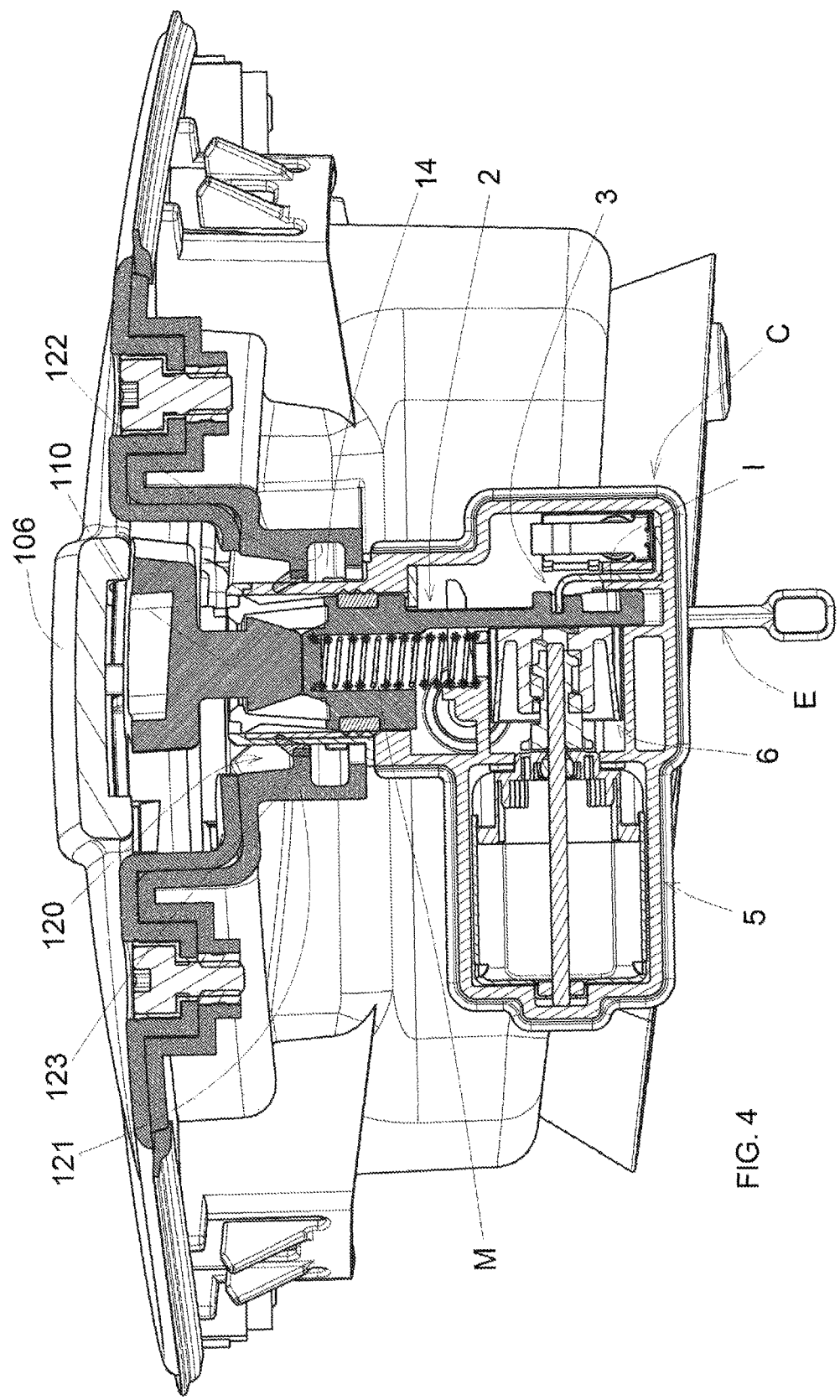
FIG. 4 is a sectional view taken along the sectional plane IV-IV of FIG. 3.
Figure 5:
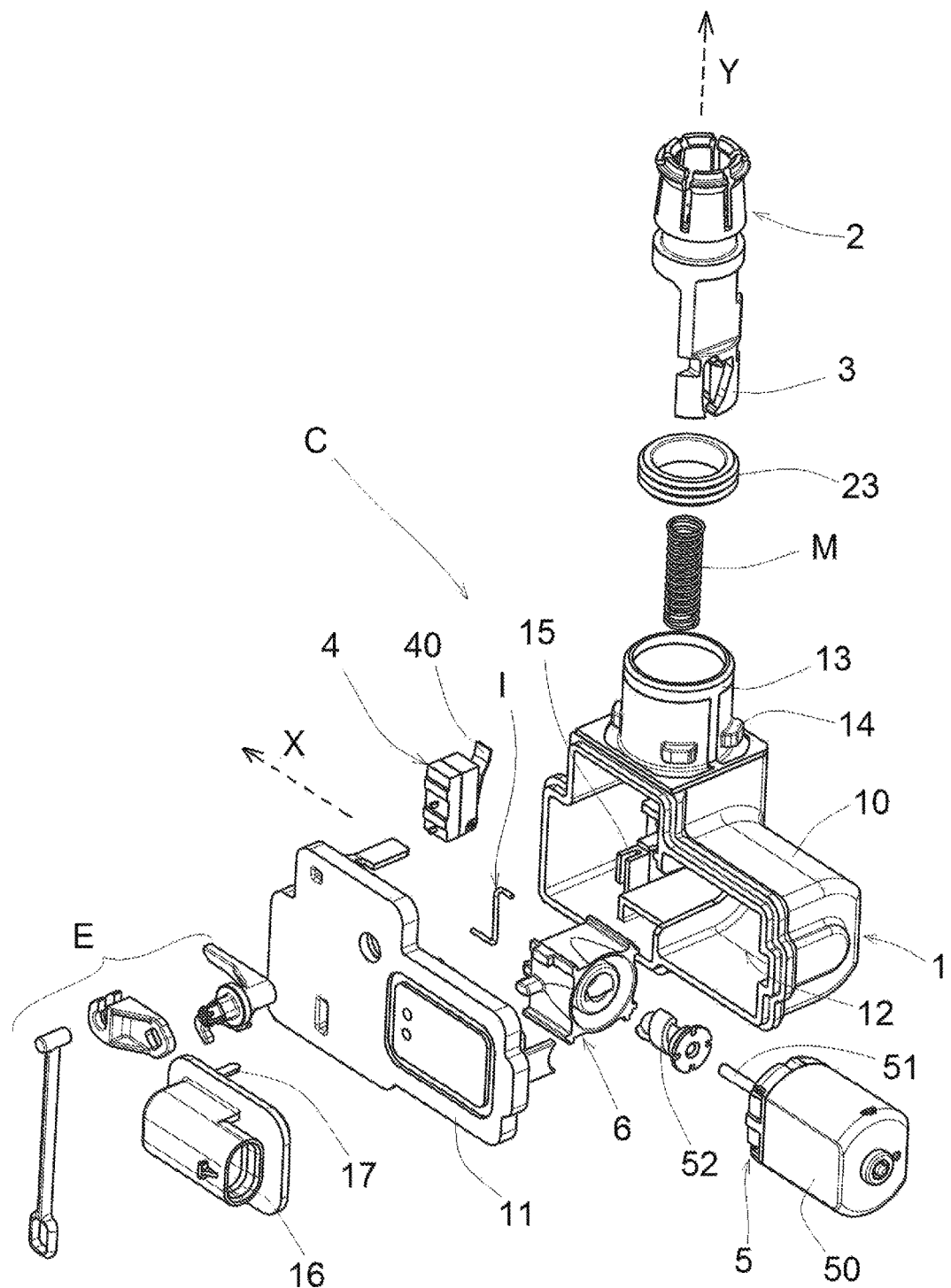
FIG. 5 is an exploded perspective view of the lock assembly of the closing system according to the invention.

With reference to FIGS. 4 and 5, the lock (C) comprises:
a closing pin (2) suitable for engaging with the pin (110) of the door,
a latch (6) suitable for locking the closing pin (2) in closing position and
an actuator (5) suitable for actuating the latch (6).

The closing pin (2) has a cam (3) and the lock comprises a follower (I) that acts in the cam (3) in such a way that the closing pin can make the translations that are typical of a lock of push-push type.

The lock (C) comprises an emergency mechanism (E) suitable for unlocking the latch (6) when the latch (6) is in closing position and the actuator (5) does not operate.

Optionally, the lock (C) can comprise a switch (4) suitable for detecting the position of the closing pin (2).

The lock comprises a box (1) comprising a shell (10) and a lid (11). An electrical connector (16) is mounted in the lid (11), being provided with electrical contacts that pass through the lid (11) in order to be connected to the electrical parts of the lock.

A housing (12) is obtained in the shell (10), and is suitable for receiving all the parts of the lock. A cylindrical shank (13) protrudes in upper position from the shell (10) and is provided with an axial channel in communication with the housing (12) of the shell. Projections (14) project radially outwards from the cylindrical shank (13) of the shell. With reference to FIG. 4, the projections (14) of the cylindrical shank of the shell are engaged in bayonet-coupling mode inside a housing (122) obtained in a shank (121) connected to the body of the module under the opening (120) of the body of the module.

Figure 5A:
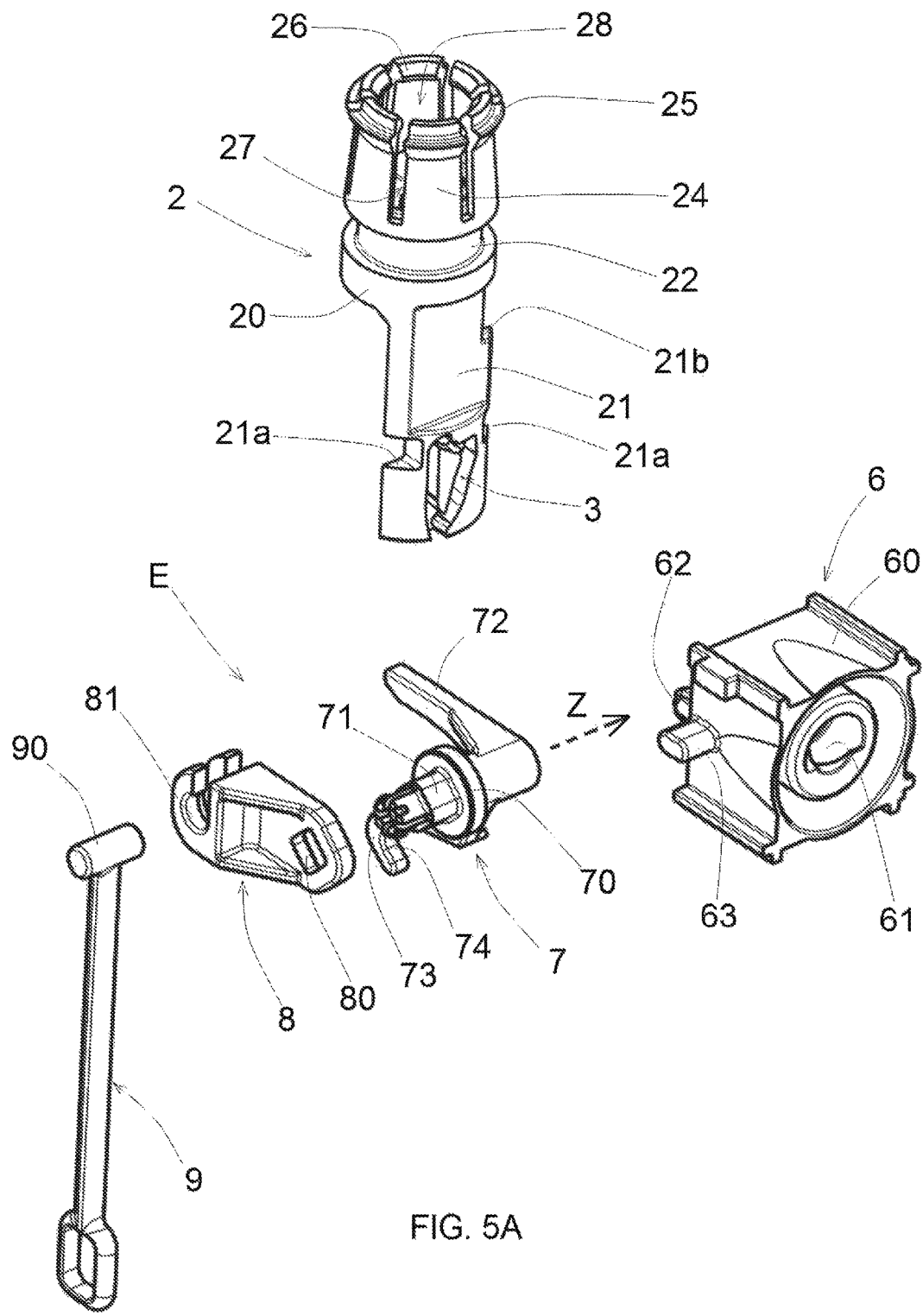
FIG. 5A is an exploded perspective view of some parts of the lock assembly of FIG. 5.

With reference to FIGS. 5 and 5A, the closing pin (2) has a cylindrical body (20) suitable for being slidingly mounted in the shank (13) of the shell in such a way that the closing pin (2) can move along an axis (Y) from a retracted closing position to an extracted opening position.

A flange (21) shaped like a rectangular plate protrudes in lower position from the cylindrical body (20) of the closing pin. The cam (3) is obtained in the flange (21).

An annular housing (22) that houses a gasket (23) is obtained in the cylindrical body (20) of the closing pin.

A plurality of elastic wings (24) protrudes in upper position from the cylindrical body (28) of the closing pin in such a way to form a cylindrical housing (28). The elastic wings (24) are separated by longitudinal slots (27). Each elastic wing (24) comprises an external tooth (25) that protrudes externally and an internal tooth (26) that protrudes internally.

With reference to FIG. 4, when the head (112) of the pin of the door is inserted in the cylindrical housing (28) of the closing pin, the elastic wings (24) elastically bend outwards and elastically return inwards, in such a way that the internal teeth (26) of the elastic wings are stopped against the stop surface (113) of the pin of the door.

The shank (121) of the module has a collar (123) that protrudes inwards. When the closing pin (2) is in retracted closing position, the collar (123) of the shank of the module is stopped against the elastic wings (24) of the closing pin that cannot bend elastically outwards and therefore the pin of the door is held inside the cylindrical housing (28) of the closing pin. Instead, when the closing pin (2) is in extracted opening position, the collar (123) of the shank of the module does not interfere with the elastic wings (24) of the closing pin, and therefore the elastic wings (24) can bend elastically outwards and the pin of the door can be extracted from the cylindrical housing (28) of the closing pin.

A spring (M) is mounted inside the housing (12) of the shell and acts on the body (20) of the closing pin to push upwards the closing pin towards its extracted opening position.

The follower (I) is mounted in a support (15) disposed in the housing (12) of the box in order to act inside the cam (3).

The follower (I) is a metal rod bent as a "Z". A first end of the follower is hinged to the support (15) of the box, in such a way that the follower (I) can rotate around an axis orthogonal to the sliding axis (X) of the closing pin and orthogonal to the flange (21) of the closing pin. A second end of the follower has a tip suitable for acting in the cam (3).

Figure 9:
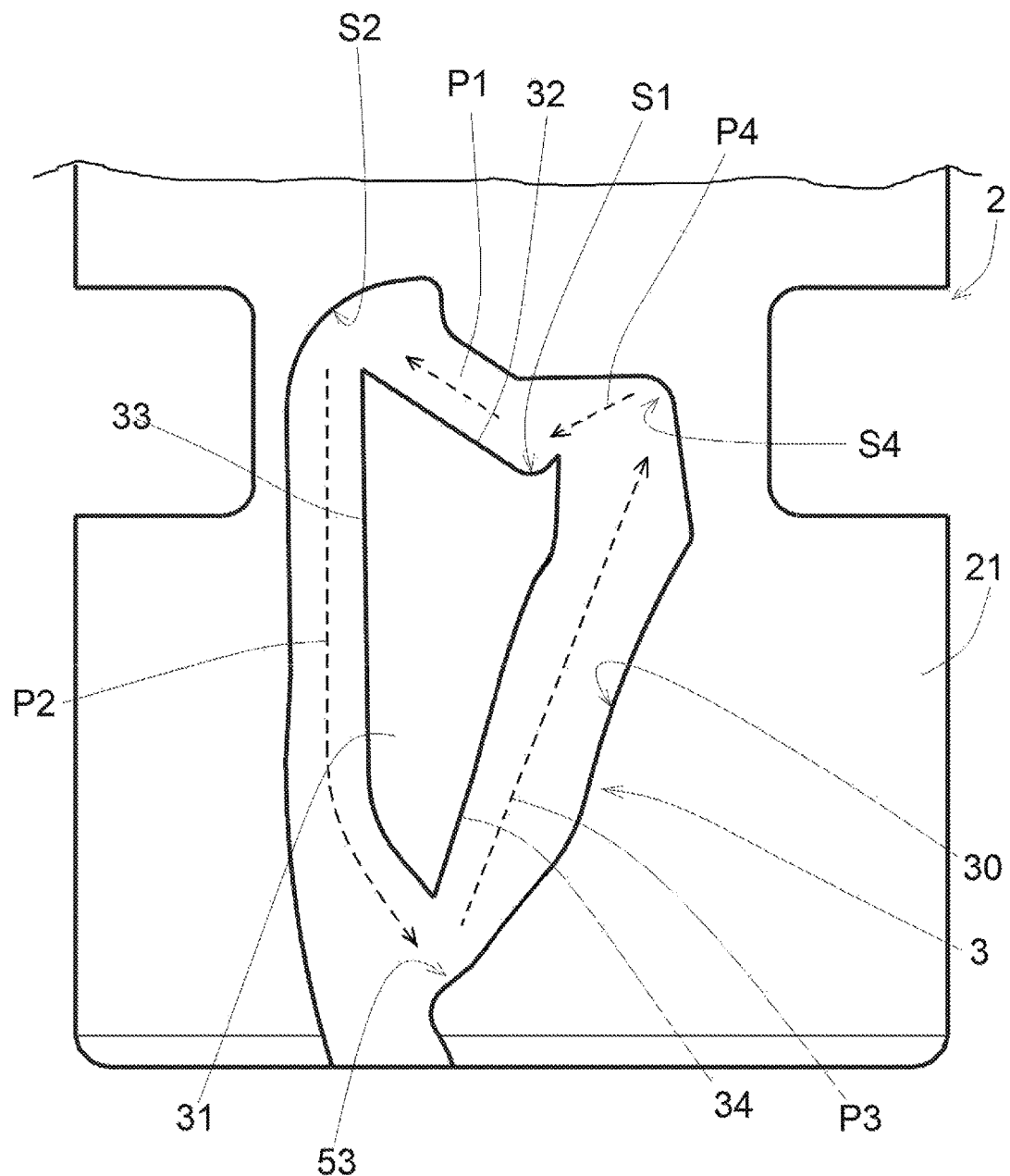
FIG. 9 is a front view of the cam of a closing pin of the lock of FIG. 5.

With reference to FIG. 9, the cam (3) of the closing pin comprises a perimeter wall (30) that defines a housing wherein a central island (31) with substantially triangular shape is disposed, The central island (31) has a first side (32), a second side (33) and a third side (34). Sliding tracks (P1, P2, P3, P4) of the follower (I) are defined between the sides (32, 33, 34) of the central island and the perimeter wall (30), forming a closed circuit.

The cam (3) has four housings:
a first housing (S1) in the corner between first side (32) and third side (34) of the central island;
a second housing (S2) in the perimeter wall (30) of the cam above the corner between first side (32) and second side (33) of the central island;
a third housing (S3) in the perimeter wall (30) of the cam under the corner between second side (33) and third side (34) of the central island; and
a fourth housing (S4) in the perimeter wall (30) of the cam above the corner between third side (34) and first side (32) of the central island.

In view of the above, four sliding tracks are defined in the cam (3): a first track (P1) going from the first housing (S1) to the second housing (S2), a second track (P2) going from the second housing (S2) to the third housing (S3), a third track (P3) going from the third housing (S3) to the fourth housing (S4) and a fourth track going from the fourth housing (S4) to the first housing (S1).

Figure 9A:
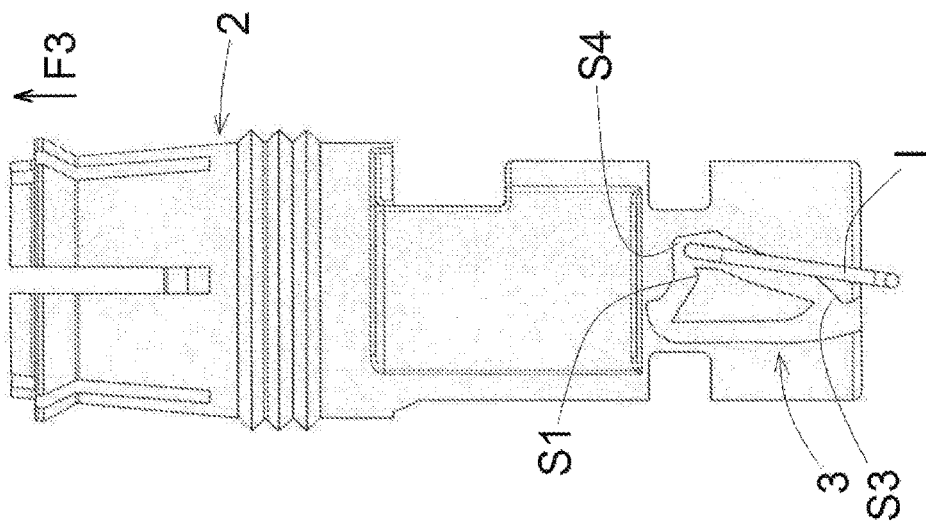
FIGS. 9A, 9B, 9C are front views of the closing pin of the lock of FIG. 5 in three different positions.

With reference to FIG. 9A, in an initial situation, the tip of the follower (I) is in the first housing (S1). When the user pushes the door (105) (first push), the closing pin (2) is pushed in the direction of the arrow (F1) against the action of the spring (M). Consequently, the tip of the follower (I) is disengaged from the first housing (S1), travels along the first track (P1) and stops against the second housing (S2), as shown in FIG. 9B.

Figure 9B:
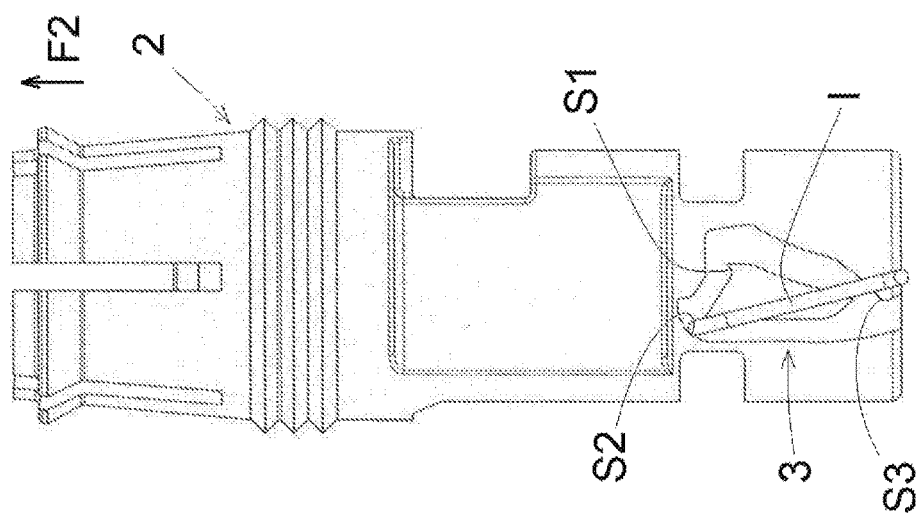
Figure 9C:
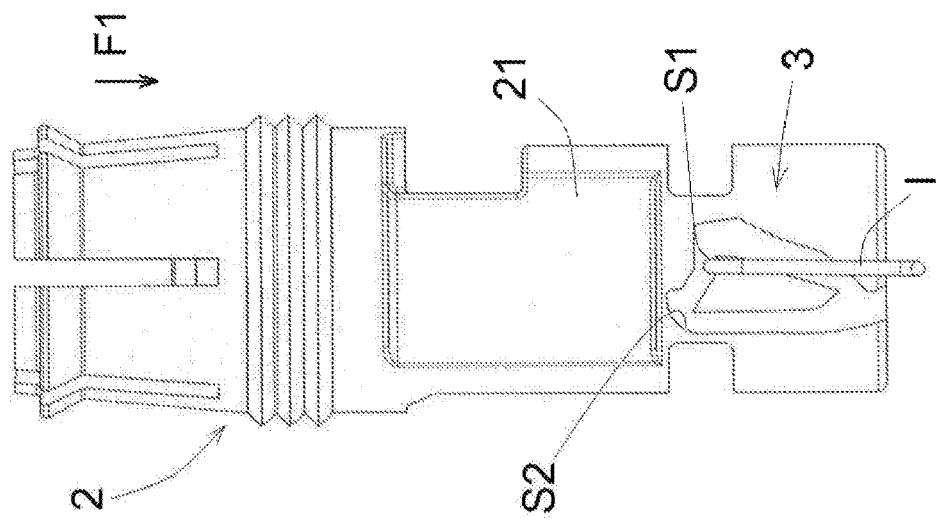

With reference to FIG. 9B, in such a situation, the closing pin (2) is in a maximum retraction position. When the user releases the door (105), the spring (M) pushes the closing pin in the direction of the arrow (F2) towards an extracted position. Consequently, the tip of the follower (I) is disengaged from the second housing (S2), travels along the second track (P2) and is positioned in the third housing (S3). In such a situation (not shown in the drawings), the closing pin (2) is in a maximum extraction position. Therefore, when the user pushes the door (105) again (second push), the closing pin is pushed upwards against the action of the spring (M). Consequently, the tip of the follower (I) is disengaged from the third housing (S3), travels along the third track (P3) and stops against the fourth housing (S4), as shown in FIG. 9C. When the user releases the door (105), the spring (M) pushes the closing pin (2) in the direction of the arrow (F3) and the follower of the cam goes from the fourth housing (S4) to the first housing (S1), traveling along the fourth track (P4).

Figure 10:
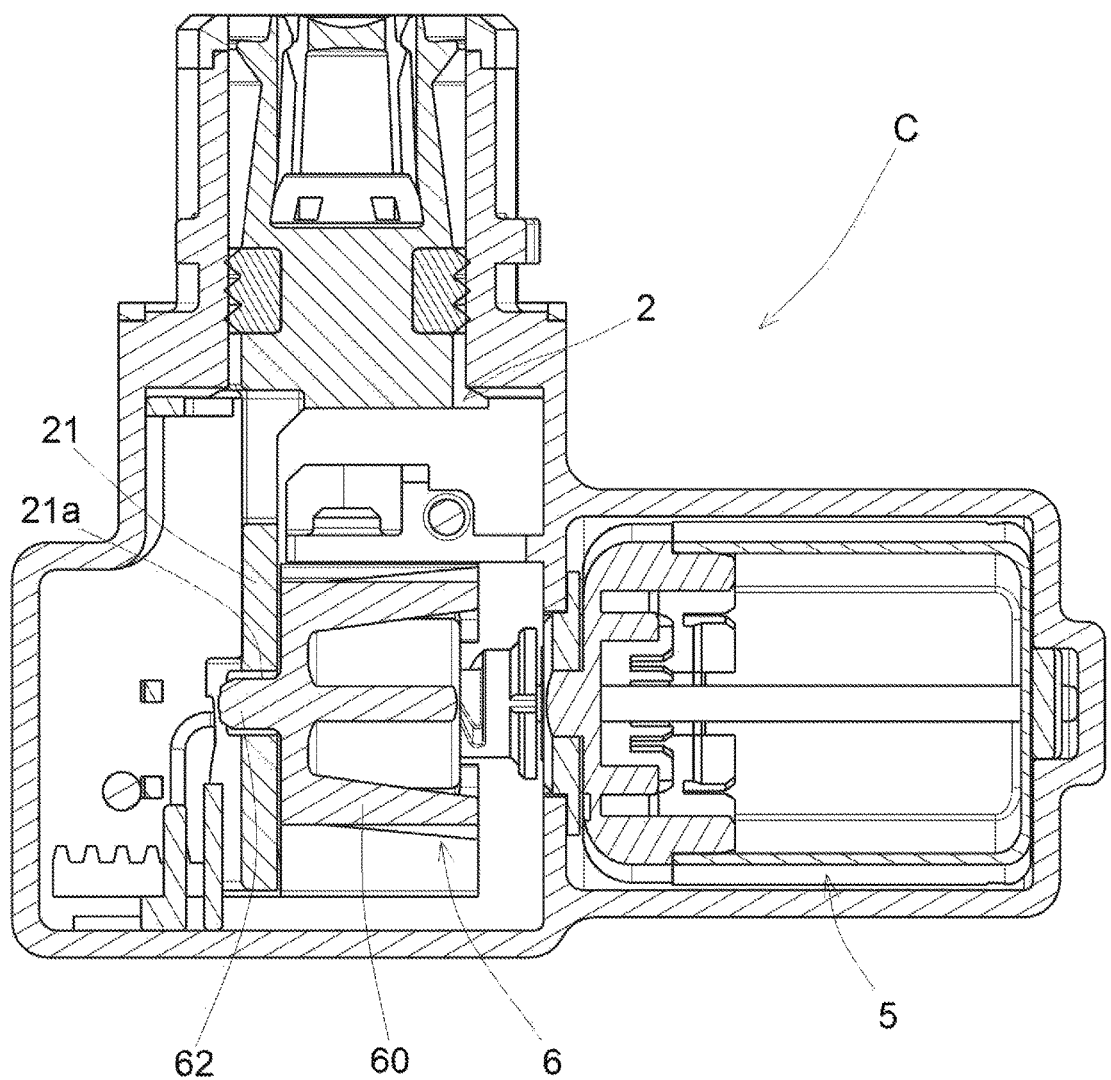
FIG. 10 is a sectional view of the lock assembly in assembled condition with the closing pin in closing position.

Going back to FIGS. 5 and 5A, the latch (6) comprises a slide (60) slidingly mounted in the housing (12) of the shell in such manner to slide along an axis (X) orthogonal to the sliding axis (Y) of the closing pin, going from a backward non-operating position to an advanced operating position wherein it engages and locks the closing pin. The slide (60) has two locking pins (62) that protrude frontally from the slide and are engaged in locking housings (21a) obtained in lateral edges of the flange (21) of the closing pin, in order to lock the closing pin, when the closing pin is in retracted closing position, as shown in FIG. 10. The slide can be provided with only one locking pin (62) and the flange of the closing pin (2) can be provided with only one locking housing (21a).

The actuator (5) can be any type of linear actuator suitable for imposing a translation to the latch (6).

Preferably, the actuator (5) comprises an electrical motor (50) with a drive shaft (51) whereon an endless screw (52) is mounted, with axis of rotation that coincides with the axis (X) of translation of the slide. The endless screw (52) is engaged in a female screw (61) obtained in the slide. In such a way, a rotation of the endless screw results in a translation of the slide (60) in the direction of the axis (X).

The actuator (5) can be of bistable type, i.e. suitable for allowing a forward travel and a backward travel of the latch (6). If the actuator comprises an electrical motor (50), said electrical motor must be able to rotate in both directions to allow for a forward travel and a backward travel of the slide (60).

Figure 6:
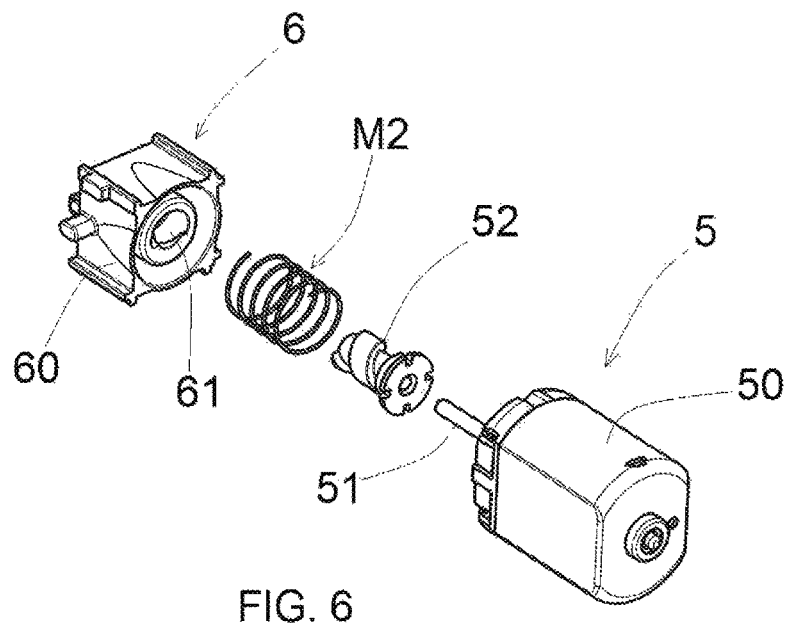
FIG. 6 is an exploded perspective view of the parts of a variant of the lock assembly of FIG. 5.

With reference to FIG. 6, the actuator (5) can be of monostable type, i.e. suitable for allowing only a forward travel of the latch (6). In this case, a return spring (M2) is disposed between the actuator (5) and the latch to return the latch to its backward non-operating position. If the actuator comprises an electric motor (50), said electric motor can rotate in only one direction to allow a forward travel of the slide (60), whereas the backward travel of the slide is generated by the return of the spring (M2).

Figure 7:
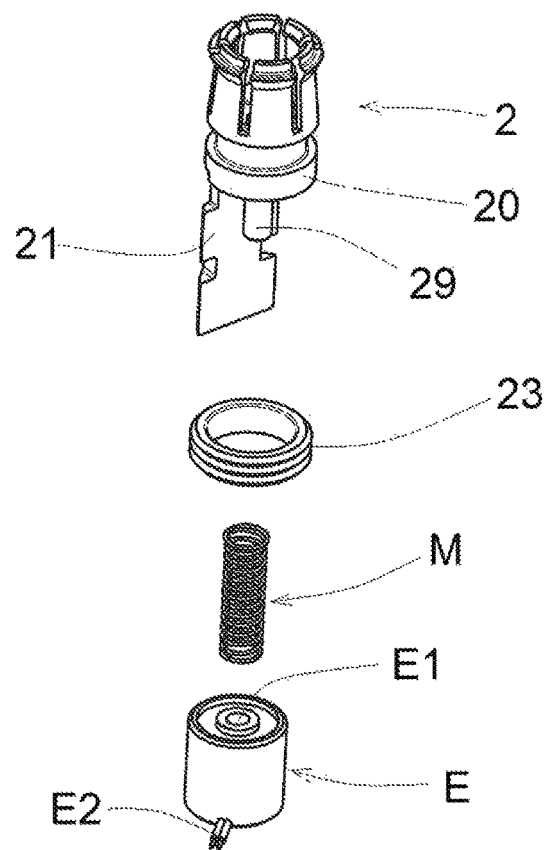
FIG. 7 is an exploded perspective view of the parts of a first embodiment of the lock assembly of FIG. 5.

With reference to FIG. 7, an electromagnet (E) is mounted in the housing (12) of the shell in order to interact with a magnetic element (29) disposed under the body (20) of the closing pin. The electromagnet (E) has a cylindrical shape with an axial hole (E1). The magnetic element (29) is a shank that protrudes in lower position from the body (20) of the closing pin in order to engage in the axial hole (E1) of the electromagnet. The flange (21) of the closing pin is maintained outside the electromagnet (E).

Electric cables (E2) protrude from the electromagnet in order to be connected to the connector (16) or to a power supply. In such a way, when the electromagnet (E) is excited, it attracts the magnetic element (29) of the closing pin, pushing the closing pin to the retracted closing position, against the action of the spring (M).

Figure 8:
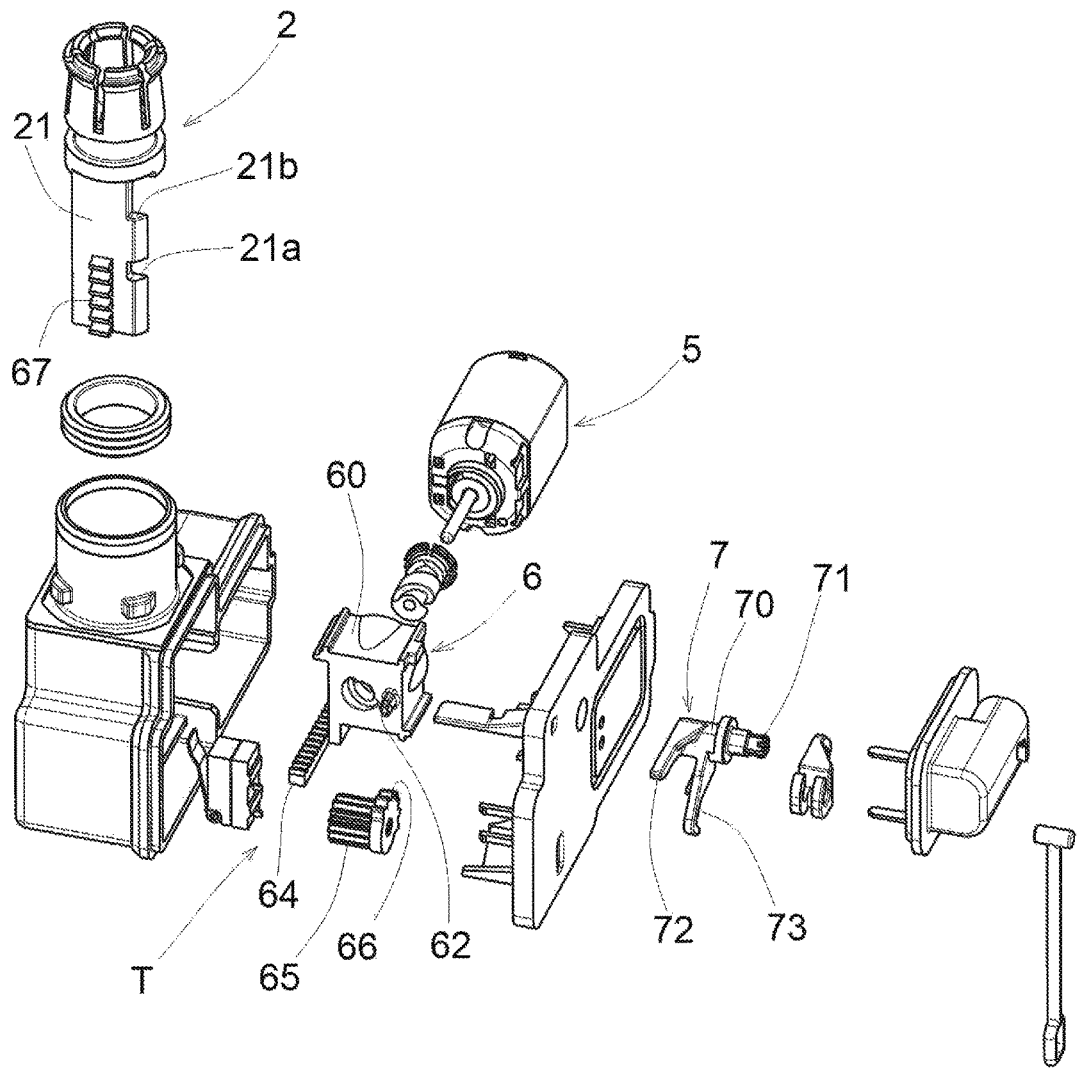
FIG. 8 is an exploded perspective view of the parts of a second embodiment of the lock assembly of FIG. 5.

With reference to FIG. 8, the closing system (100) also comprises transmission means (T) that connect the slide (60) of the latch to the closing pin (2), in such manner that the movement of the slide from the backward nonoperating position to the advanced operating position automatically produces the movement of the closing pin (2) from the extracted opening position to the retracted closing position. A rack (64) is mounted on one side of the slide (60), in such a way to protrude laterally and frontally with respect to the slide (60). The rack (64) is engaged in a pinion-shaped gear (65) that is revolvingly mounted in the shell with an axis of rotation that is orthogonal to the axis (X) of translation of the latch and to the axis (Y) of translation of the closing pin.

A toothed wheel portion (66), having the same axis as the gear, but a higher diameter than the gear (65), is mounted in the gear (65). A rack (67) is mounted in the flange (21) of the closing pin, on the opposite side of the cam (3). Therefore, the transmission means (T) comprise the rack (64) of the latch, the gear (65), the toothed wheel portion (66) and the rack (67) of the locking pin.

The rack (67) of the locking pin engages with the toothed wheel portion (66) of the gear. In such a way, when the actuator (5) is actuated to bring the latch (6) to the forward operating position, the rack (64) of the latch actuates the gear (65) and the toothed wheel portion (66) that engages in the rack (67) of the closing pin (2), automatically driving the closing pin (2) in closing position, without the need for the user to actuate the closing pin (2) manually.

Figure 11:
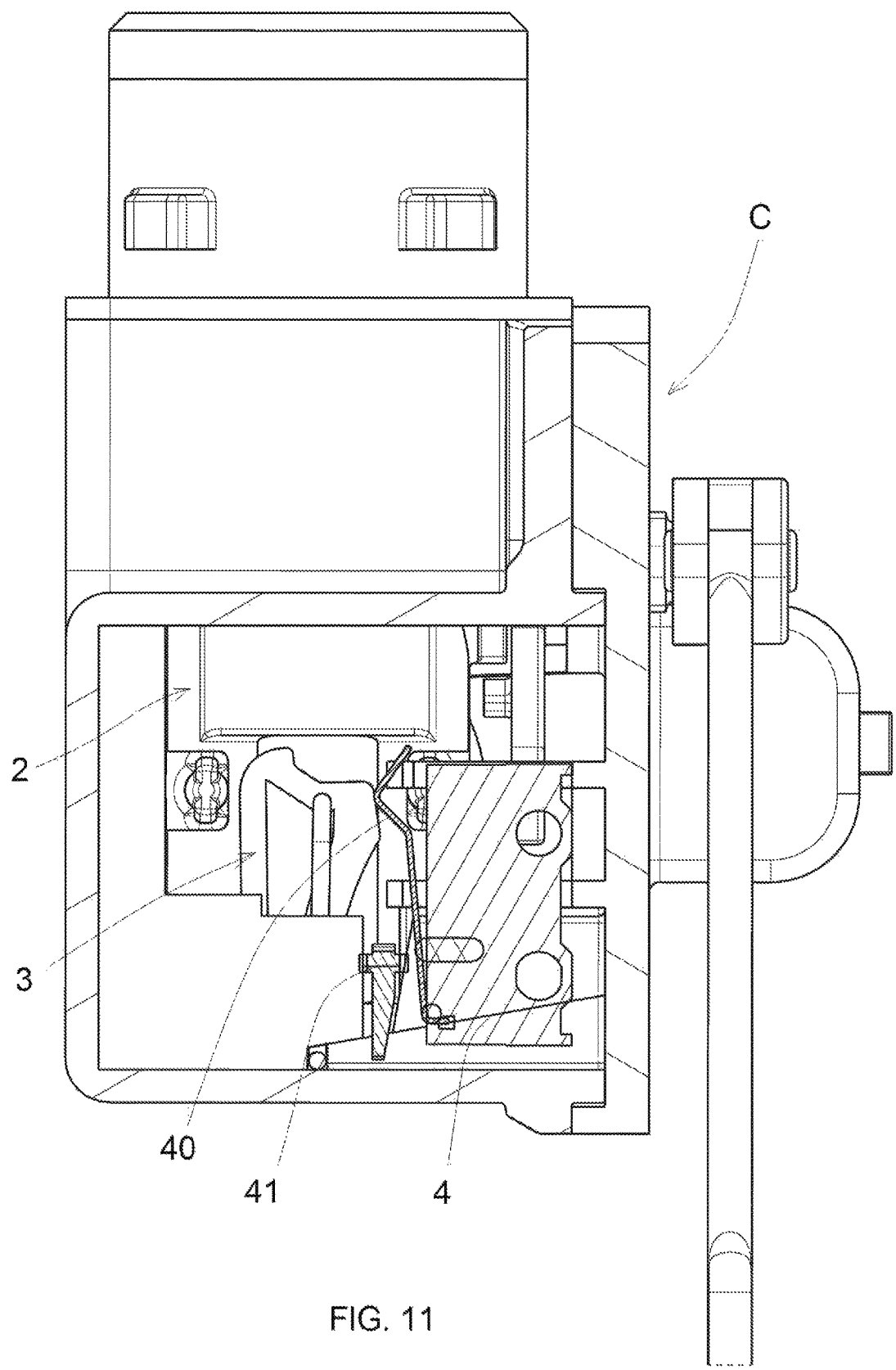
FIG. 11 is a sectional view of the lock assembly in assembled condition showing a switch of the lock assembly.

With reference to FIG. 11, the switch (4) has a flexible blade (40) that, when actuated, activates the switch that sends an electrical signal to a control unit of the vehicle.

A counter-part (41) is fixed to a lower part of the flange (21) of the closing pin, close to the cam (3). The switch (4) is mounted in the housing (12) of the shell, in such a position that the blade (40) of the switch is pushed by the counter-part (41) of the closing pin, when the closing pin goes from the retracted closing position to the extracted opening position. In this way, the control unit of the vehicle receives the command signal when the closing pin is in extracted opening position and has information on the position of the closing pin.

Figure 12:
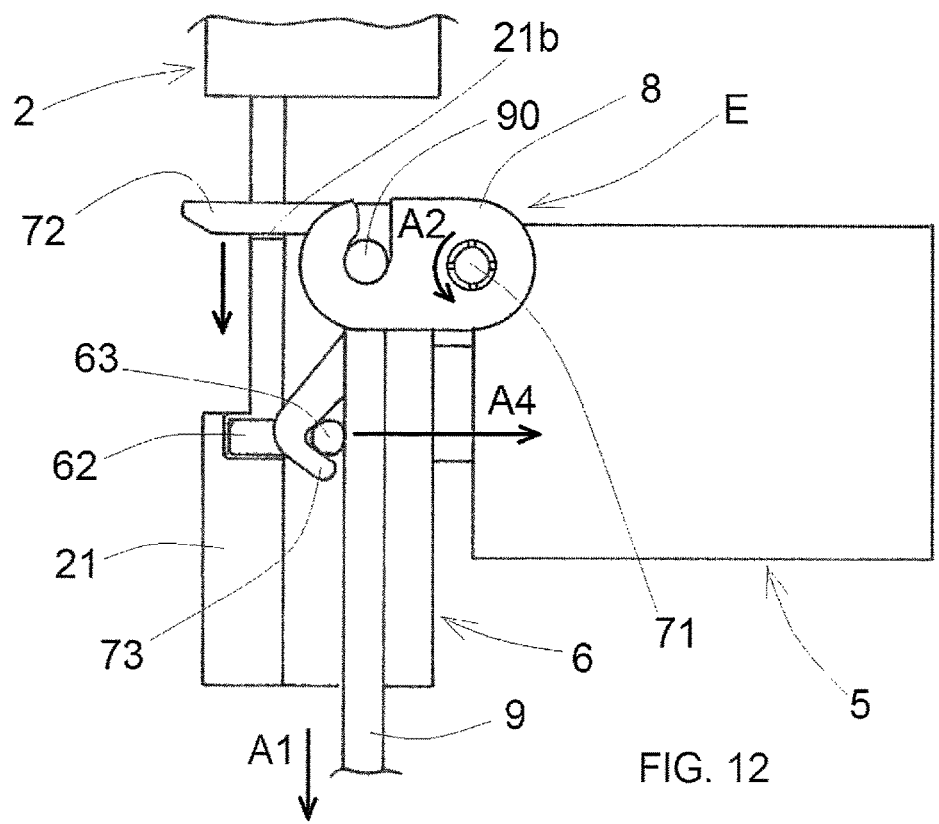
FIG. 12 is a diagrammatic view of a portion of the lock assembly in assembled condition, showing the operation of the emergency device.
Figure 13:
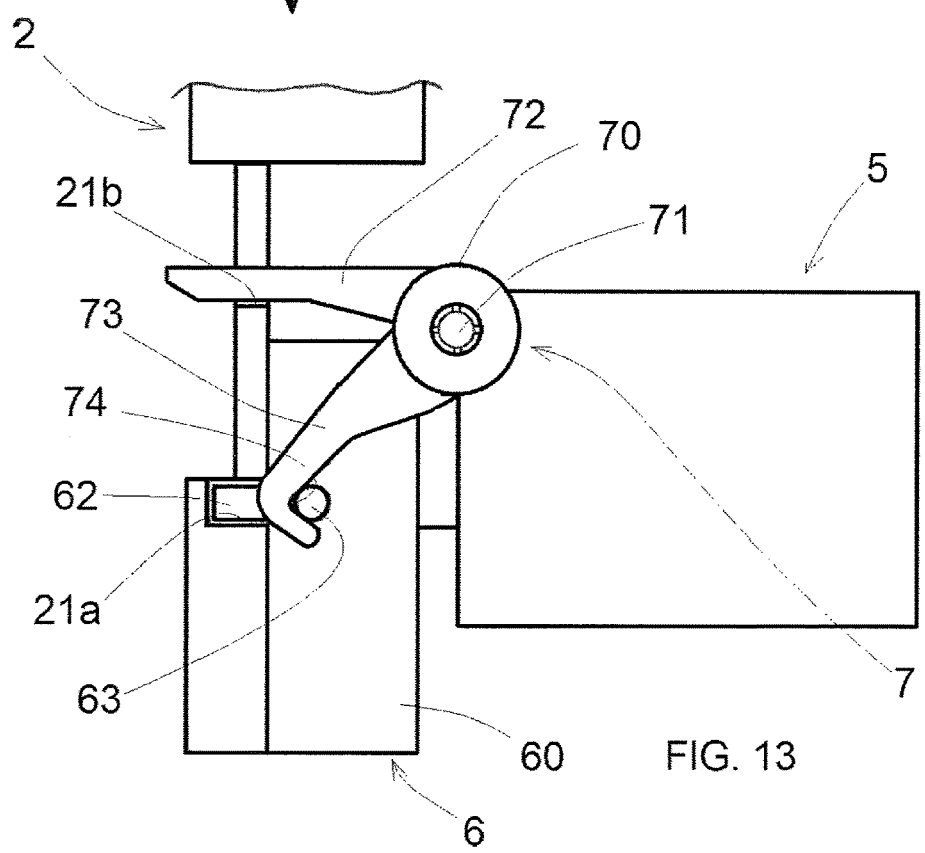
FIG. 13 is the same view as FIG. 11, wherein a hook of the emergency device is omitted.

With reference to FIGS. 5A, 12 and 13, the emergency mechanism (E) comprises an emergency device (7) provided with a central body (50) hinged to the shell in such a way to rotate around an axis (Z) orthogonal to the axis (Y) of translation of the closing pin and to the axis (X) of translation of the slide (60) of the latch.

The emergency device (70) has a keying pin (71) with parallelepiped or prismatic shape, which protrudes along the axis (Z) of rotation of the emergency device. The emergency device (70) comprises a first arm (72) that protrudes radially from the central body (70) in parallel direction to the axis (X) of translation of the slide, and a second arm (73) that protrudes radially from the central body (70) of the emergency device, being angularly spaced from the first arm (72) by approximately 40°-80°. The second arm (73) has an "L"-shape in such a way to define a retention housing (74).

A fixing pin (63) protrudes laterally from the slide (60) of the latch. A fixing housing (21b) is obtained in a lateral edge of the flange (21) of the closing pin, above the locking housing (21a).

The first arm (72) of the emergency device is stopped on the fixing housing (21b) of the closing pin. The fixing pin (63) of the slide (60) is engaged in the retention housing (74) of the second arm (73) of the emergency device.

The emergency mechanism (E) also comprises a hook (8) provided with a slot (80) that receives the pin (71) of the emergency device. The slot (80) 30 has a rectangular or polyhedral shape. In such way, the hook (8) is joined with the emergency device (7). Evidently, the hook (8) can be integrated in the emergency device (7). The hook (8) also comprises a housing (81) suitable for receiving a pin (90) connected to an emergency string (9) that comes out of the box (10) in order to be manually actuated by the user.

With reference to FIG. 12, when the user pulls the emergency string (9) in the direction of the arrow (A1), the hook (8) makes a rotation in the direction of the arrow (A2), driving the emergency device (7) into rotation. In view of the above, simultaneously, the first arm (72) of the emergency device acts on the closing pin, lowering the closing pin in the direction of the arrow (A3), and the second arm (73) of the emergency device actuates the slide (60) of the latch, moving the slide backwards in the direction of the arrow (A4) in such a way that the locking pin (62) of the slide is disengaged from the locking housing (21a) of the closing pin. In this way, the closing pin is unlocked and it can go to its extracted opening position because of the thrust of the spring (M).

I claim:

1. Closing system comprising:
   a module having a tubular body with a duct suitable for communicating with a fuel tank of a vehicle,
   a door hinged to the body of the module with a hinge, in such manner to close the duct; and
   a lock mounted in the body of the module, outside the duct;
   wherein said lock comprises:
      a box comprising a shell and a lid,
      a closing pin suitable for fastening said door, said closing pin being mounted in translating mode in said box in such manner to slide along an axis to go from a retracted closing position to an extracted opening position,
      a spring that stresses the closing pin towards the extracted opening position,
      a cam obtained in said closing pin,
      a follower mounted in said shell and having a tip that acts in said cam of the closing pin in order to control the translation movement of the closing pin,
      a latch comprising a slide mounted in translating mode in the shell, and
      an actuator mounted in the shell;
   wherein
      the door provides for a pin that protrudes towards the duct of the module and has a truncated-conical head;
      the closing pin is suitable for fastening the pin of the door and comprises a cylindrical body with a plurality of elastic tabs that define a cylindrical housing suitable for receiving the head of the pin of the door; each elastic tab having an external tooth and an internal tooth;
      the follower is revolvingly mounted in the shell in such manner to rotate freely around an axis;

the slide of the latch is mounted in translating mode in the shell in such manner to slide along an axis orthogonal to the sliding axis of the closing pin to go from a backward unlocking position to an advanced locking position wherein the latch engages and locks the closing pin, the actuator is suitable for actuating the latch, and the module has an opening and a shank disposed under the opening (120) and provided with a collar that protrudes inwards to stop against the elastic tabs of the locking pin when the locking pin is in retracted closing position;

said lock also comprising an emergency mechanism that acts on said closing pin and on said latch; said emergency mechanism being manually actuated by the user to unlock the closing pin from the latch.

2. The closing system of claim 1, wherein said shell comprises a cylindrical shank wherein said closing pin is slidingly mounted, and projections radially protruding outwards from said cylindrical shank in order to be engaged in bayonet-coupling mode with a housing obtained in said shank of the body of the module.

3. The closing system of claim 1, wherein said closing pin has a flange shaped as a plate wherein said cam is obtained, comprising a perimeter wall that defines a housing wherein a central island with substantially triangular shape is disposed, having a first side, a second side and a third side; wherein four housings and four sliding tracks of the follower are defined between the sides of the central island and the perimeter wall, forming a closed circuit.

4. The closing system of claim 1, wherein said actuator is a linear actuator of bistable type that contains a go-return path of the slide of the latch.

5. The closing system of claim 1, wherein said actuator is a linear actuator of monostable type that contains a go path of the slide of the latch and a return spring is disposed between the slide of the latch and the actuator to return the slide to the backward non-operating position.

6. The closing system of claim 1, also comprising an electromagnet mounted in said shell and a magnetic element fixed to said closing pin to attract the closing pin to retracted closing position.

7. The closing system of claim 1, also comprising transmission means connecting the slide of the latch to the closing pin in such manner that the movement of the slide from the backward non-operating position to the advanced operating condition automatically produces the movement of the closing pin from the extracted opening position to the retracted closing position.

8. The closing system of claim 7, wherein said transmission means comprise:

a rack fixed to the slide of the latch;

a gear revolvingly mounted in the shell and engaging with the rack (64) of the latch; and a toothed wheel portion joined to the gear and engaging in a rack fixed to the closing pin.

9. The closing system of claim 1, also comprising a switch provided with an activation blade of the switch, and a counter-part fixed to a lower part of said closing pin; said switch being disposed in said shell in such a position that the blade of the switch is pushed by the counter-part of the closing pin when the closing pin goes from the retracted closing position to the extracted opening position.

10. The closing system of claim 1, wherein said emergency mechanism comprises:

an emergency device hinged in said shell with an axis of rotation orthogonal to the axis of translation of the closing pin and to the axis of translation of the latch; said emergency mechanism comprising a first arm engaged in a fixing housing of the closing pin, and a second arm having a retention housing that is engaged in a fixing pin protruding from said slide of the latch;

a hook jointly connected to the emergency device; and an emergency string connected to the hook and capable of being manually actuated by the user to rotate the hook and the emergency device in such manner to determine a downward translation of the closing pin and simultaneously a retraction of the slide of the latch that is unlocked from the closing pin.

* * * * *